United States Patent
Williams et al.

(10) Patent No.: US 7,632,336 B2
(45) Date of Patent: Dec. 15, 2009

(54) BATCH DEGASSING OF DIELECTRIC OIL WITH VACUUM SONICATION

(75) Inventors: Douglas Lee Williams, Saint Charles, MO (US); Jeffrey Stephen Malkmus, St. Peters, MO (US); Gerald Scott Brown, Ballwin, MO (US); Samuel Berliner, III, Westbury, NY (US)

(73) Assignee: DRS Sustainment Systems, Inc., St. Louis, MO (US)

( * ) Notice: Subject to any disclaimer, the term of this patent is extended or adjusted under 35 U.S.C. 154(b) by 505 days.

(21) Appl. No.: 11/619,872

(22) Filed: Jan. 4, 2007

(65) Prior Publication Data

US 2008/0163752 A1    Jul. 10, 2008

(51) Int. Cl.
*B01D 19/00*    (2006.01)
(52) U.S. Cl. .......................... 95/30; 95/175
(58) Field of Classification Search ............. 95/30; 96/175
See application file for complete search history.

(56) References Cited

U.S. PATENT DOCUMENTS

| | | | |
|---|---|---|---|
| 3,151,958 A | 10/1964 | Bodine | |
| 3,229,448 A * | 1/1966 | Jacke | 96/175 |
| 3,591,946 A * | 7/1971 | Loe | 96/175 |
| 4,070,167 A | 1/1978 | Barbee et al. | |
| 4,339,247 A | 7/1982 | Faulkner et al. | |
| 4,437,082 A * | 3/1984 | Walsh et al. | 336/58 |
| 4,661,612 A | 4/1987 | George et al. | |
| 5,110,443 A | 5/1992 | Gregoli et al. | |
| 5,196,343 A | 3/1993 | Zerhouni et al. | |
| 5,283,001 A | 2/1994 | Gregoli et al. | |
| 6,193,786 B1 | 2/2001 | Henderson | |
| 6,230,799 B1 | 5/2001 | Slaughter et al. | |
| 6,682,604 B1 | 1/2004 | Nulwala | |

(Continued)

FOREIGN PATENT DOCUMENTS

DE    4212972    10/1993

(Continued)

OTHER PUBLICATIONS

"And Now For Something Completely Degassing—Polaris Instruments," 2000-2005 Pro Talk Ltd., UK.

(Continued)

*Primary Examiner*—Duane Smith
*Assistant Examiner*—Douglas J Theisen
(74) *Attorney, Agent, or Firm*—Sonnenschein Nath & Rosenthal LLP (57) ABSTRACT

A degassing and water removal apparatus is used in combination with the testing or replacement of dielectric oil in an RF transmitter. The apparatus comprises at least one ultrasound transducer in vibrational communication with a bulk oil sample held in a tank having a reduced internal air pressure. The tank has fluid connections to the RF transmitter through which oil from the transmitter is drained to the tank and through which the ambient air pressure in the transmitter is reduced. A fluid pump is used to pump the oil from the tank back to the RF transmitter. In a method of using such an apparatus, the RF transmitter is held at reduced internal pressure during the return of oil thereto, so that the oil does not dissolve gases in the atmosphere internal to the RF transmitter.

15 Claims, 3 Drawing Sheets

U.S. PATENT DOCUMENTS

| | | | |
|---|---|---|---|
| 2002/0137805 A1 | 9/2002 | Huang et al. | |
| 2003/0164479 A1* | 9/2003 | Goedde et al. | 252/570 |
| 2005/0240003 A1 | 10/2005 | Galewski et al. | |

FOREIGN PATENT DOCUMENTS

| | | |
|---|---|---|
| EP | 186736 | 7/1986 |
| JP | 59179113 | 10/1984 |
| JP | 60068010 | 4/1985 |
| RU | 2094594 | 10/1997 |
| RU | 2186095 | 7/2002 |
| SU | 929150 | 5/1982 |
| SU | 1684322 | 10/1991 |

OTHER PUBLICATIONS

Fuchs, F. John, "Ultrasonic Clearning: Fundamental Theory and Application,".

"AN-7: Ultrasonic Degassing of Liquids," Misonix.

"Oil Degassing," 2006, Compact Membrane Systems.

"Pall Portable Fluid Purifier," Pall Corporation.

"HTP070 Purifier for Dielectric Fluids," Pall Corporation, Nov. 2000.

"HNP006 Series Fluid Conditioning Purifier," Pall Corporation, Jul. 2003.

"Vacuum Filters," www.cjc.dk/index.php?m=p&pid=36.

"Hielscher—Ultrasound Technology," www.hielscher.com/ultrasonics/i500_p.htm.

"Gas Vac II Industrial Vacuum Degassing Unit," www.freemansupply.com/GasVacIIIndustrial.htm.

International Search Report corresponding to PCT/US08/50281; Apr. 30, 2008.

* cited by examiner

BATCH DEGASSING OF DIELECTRIC OIL WITH VACUUM SONICATION

STATEMENT REGARDING FEDERALLY SPONSORED RESEARCHSS

At least a portion of the development of this invention was supported by the NAVAL AIR WARFARE CENTER, AIRCRAFT DIVISION through Contracts No. N00189-95-C-0333 and N68335-05-C-0337. Therefore, the United States Government may have certain rights with regard to this invention.

CROSS REFERENCE TO RELATED APPLICATION

Not Applicable

BACKGROUND OF THE INVENTION

1. Field of the Invention

The invention generally relates to systems and methods for batch degassing of dielectric oils using vacuum sonication. More particularly, the invention relates to a semi-automated apparatus comprising a tank to which oil can be transferred for heating and sonication while under reduced ambient pressure in order to remove substantial amounts of dissolved gas and moisture therefrom.

2. Description of Related Art

Electronic warfare is a component of modern warfare, which, in an offensive posture, involves the use of electromagnetic radiation to inhibit an adversary from effective use of the electromagetic spectrum, thereby inhibiting the adversary's communications and surveillance activity. Techniques associated with offensive electronic warfare include such tactics as jamming, deception, and active cancellation.

Particularly for jamming activities, radio-frequency (RF) transmitters are attached to aircraft that are flown above regions where such interference is to be applied. The U.S. Navy uses a certain RF transmitter tactical jamming system known as the ALQ-99. Such a jamming system, as with many RF transmitters, includes an oil for the dielectric separation of, as well as the cooling of, transmitter components. A common dielectric oil used for this purpose is a synthetic poly-alpha-olefin (PAO).

For aircraft flown by the U.S. Navy, theses jamming RF transmitters are serviced and maintained through the use of automatic test equipment (ATE). The U.S. Navy developed a relatively standard base set of test equipment termed the consolidated automated support system (CASS). As a component of CASS in a specific configuration, a high power device test subsystem (HPDTS) was developed particularly for testing of high power equipment, such as the RF transmitters used in electronic warfare. This HPDTS, as a comprised subunit of CASS, is also termed a high power offload to CASS (HPOC).

The HPOC comprises two racks of equipment, an electronics rack for testing transmitter functions, and a liquid cooling unit (LCU). During test procedures, the RF transmitters, commonly referred to in this context as units under test (UUT), generate significant amounts of heat, which is dissipated by circulating the dielectric oil through the LCU.

It has been discovered that transmitters that have been serviced and tested in this way later exhibit increased rates of failure during use on aircraft flying at normal altitudes. The failures appear to be the result of the degradation of dielectric properties of the oil. Dielectric property degradation is generally the result of contaminants in the oil, and is often related to dissolved gases.

During testing with the HPOC the dielectric oil is exposed to atmospheric air, the components of which dissolve in the oil. In fact, the PAO in the Navy's transmitters becomes saturated with gas on exposure to air. In particular, the oil will solvate, and may become saturated with, oxygen, nitrogen, and carbon dioxide, among other gases from the air. Other dissolved gases that may be contained in the dielectric oil and which lead to dielectric degradation are break-down products of the oil, such as hydrogen and methane. As well, water either from moisture in the air or as a degradation product may also be present in the oil and reduce dielectric effectiveness.

The current LCU process executed by the ALQ-99 Test Program heats the PAO to 55° C. and then applies a 26 inch Hg vacuum for 5 minutes, removes the vacuum to circulate the PAO for 1 minute and then applies vacuum for 5 more minutes. From the PAO's saturation point of about 13.5% dissolved gases, the LCU degassing process generally results in a dissolved gas content in the PAO of about 11.5%-12%, a removal of only about 1-2% of the dissolved gases. For optimum operation, however, the ALQ-99 RF transmitter requires the PAO installed therein to have a total dissolved gas content of less than 1.75%.

There are several known methods for removing dissolved gas from liquids. A first and relatively simple method is to apply a high vacuum to a closed space adjacent to the surface of a batch oil. Through an equilibrium-driven process, the dissolved gases will eventually be removed from the oil to the vacuum. This equilibration process will generally take a long time, however. Such a process is the method used by the existing LCU, and without modification, is insufficient to meet the current needs of the ALQ-99 and other dielectric oil applications.

A modification of the first method increases the rate of oil degassing by maximizing the surface area of the oil so that dissolved gases in the oil have a lesser distance to travel to escape from the surface of the oil, resulting, for any given volume of oil, in less time to degas. Increased surface area can be accomplished by creating a thin film of oil, such as by spraying the oil onto a surface, for example, a spinning disk, filters, or by atomizing the oil into a fine mist. A principal disadvantage of this method is based in the balance that must be struck between the size of the apparatus in which the oil's increased surface area is created and the volume throughput of oil through the apparatus. Increasing oil surface area either requires a time consuming repetition on multiple small volume samples of the bulk oil of a process such as spraying or atomizing, or requires a large apparatus in which larger volume samples of oil can be sprayed or atomized. Commercial products using this increased-surface-area method are available, but are primarily used in the electric power industry, where size is not a significant factor since the apparatuses are generally stationary and associated with large commercial power plants. These commercial apparatuses are too large for use shipboard or in a mobile analytical laboratory, either of which are preferred circumstances for testing and maintenance activities associated with RF transmitters used on U.S. Navy aircraft.

Further modification to the above-described methods involves applying ultrasonic pressure waves to the oil, while simultaneously applying a high vacuum to a closed space adjacent to the oil. The sonication forces dissolved gases to coalesce into bubbles, the gas bubbles then rise to the oil surface and burst releasing the gas to the tank head space, from which the vacuum system removes the gases. The gas bubbles formed by coalescence travel much faster through the oil than do the uncoalesced, dissolved gases in the first method.

Systems for utilizing a sonication degassing method for transformer oils is described in both Soviet Union patent publication SU929150, filed Jan. 9, 1980, published May 23, 1982, naming as inventors, Sukhanov et al. (the '150), and Russian patent publication RU2186095, filed Aug. 14, 2001, published Jul. 27, 2002, naming as inventors, Shved et al. (the '095). The '150 describes a system in which transformer oil is pumped under relatively high pressure from the transformer into a vacuum tank in a stream that impinges on an acoustic resonator and thereby creates ultrasonic vibrations in bulk oil collected in a processing tank. The '095 describes a system in which oil is recirculated through two vacuum sonication tanks, and is repeatedly being filtered for the purpose of accelerating the cavitation process. During recirculation, the oil is atomized as it enters each tank. The described method includes a recirculation process whereby processed oil is returned to the transformer and mixed therein with unprocessed oil, so that the method applies a combined batch and continuous mode of operation. The result of processing is indicated as removing gas from oil having a starting gas content of about 1% to produce oil having a gas content of about 0.1%.

SUMMARY OF THE INVENTION

The following is a summary of the invention in order to provide a basic understanding of some aspects of the invention. This summary is not intended to identify critical elements of the invention or to delineate the scope of the invention. Its sole purpose is to present some concepts of the invention in a simplified form as a prelude to the more detailed description that is presented later.

To better address the performance requirements for regenerated dielectric oil properties, particularly, in an embodiment, as to requirements for certain RF transmitters used for electronic warfare, described herein are embodiments of a degassing and water removal apparatus to be used in combination with the testing or replacement of dielectric oil in the an RF transmitter. The apparatus comprises at least one ultrasound transducer in vibrational communication with a bulk oil sample held in a tank having a reduced internal air pressure. The tank has fluid connections to the RF transmitter through which oil from the RF transmitter can be drained to the tank and through which the ambient air pressure in the RF transmitter can be reduced as a result of gases being evacuated through these fluid connections. A fluid pump is used to pump the oil from the tank back to the RF transmitter.

In a method of using such an apparatus, the RF transmitter is held at reduced internal pressure during the return of oil thereto, so that the oil does not dissolve gases in the atmosphere internal to the RF transmitter.

An embodiment is an apparatus for the batch degassing of a dielectric oil, which comprises a tank for holding dielectric oil transferred from an electronic device; at least one ultrasonic transducer for generating ultrasonic frequency waves within the tank; a vacuum pump connected to the tank and capable of reducing the ambient pressure within the tank; a first and a second fluid transfer conduit adapted to connect the tank to the electronic device for transfer of oil therebetween; a vent valve connected to the first fluid transfer conduit, which when open allows ambient air external to the tank and the electronic device to enter the first fluid transfer conduit; a fluid pump connected to the second fluid transfer conduit and capable of pumping oil in a first flow direction from the tank to the electronic device through the second fluid transfer conduit; and a pressure relief valve having an inlet and an outlet, the inlet connected to the second fluid transfer conduit at a position after the fluid pump along the first flow direction, the outlet connected to the tank, the pressure relief valve allowing flow therethrough in a direction from the second fluid transfer conduit to the tank when fluid pressure in the second fluid transfer conduit reaches a threshold valve set for the purpose of protecting the electronic device from experiencing fluid pressures higher than the threshold value.

In an alternate embodiment, the apparatus further comprises a power outlet that can be connected to the electronic device to supply power thereto. In an embodiment, such a power outlet provides 208 V, 400 Hz AC electric power. In a further alternate embodiment, the at least one ultrasonic transducer is attached to the outside of the tank. An embodiment includes an apparatus wherein the at least one ultrasonic transducer attached to the outside of the tank comprises a number of ultrasonic transducers, the number being in the range of about 8 to about 10.

In another embodiment, the apparatus further comprises a radio-frequency transmitter connected to the first and second fluid transfer conduits, and thereby connected to the tank. An alternate embodiment includes such a transmitter, which contains fewer than 20 gallons of dielectric oil. Moreover, in an embodiment, the transmitter is an ALQ-99 tactical jamming transmitter.

A further embodiment is a method of batch degassing dielectric oil used in an electronic device, the method comprising providing an apparatus for degassing dielectric oil, which apparatus comprises a tank for holding dielectric oil transferred from an electronic device; at least one ultrasonic transducer for generating ultrasonic frequency waves within the tank; a vacuum pump connected to the tank and capable of reducing the ambient pressure within the tank; at least one fluid transfer conduit adapted to connect the tank to the electronic device for transfer of oil therebetween; a fluid pump connected to the fluid transfer conduit and capable of pumping oil in a first flow direction from the tank to the electronic device through the second fluid transfer conduit; connecting the conduit between the apparatus and the electronic device. The method also comprises reducing ambient pressure in the tank through operation of the vacuum pump; transferring substantially all dielectric oil from the electronic device to the tank through the conduit as a result of a pressure differential between the tank and the electronic device; reducing ambient pressure in a space within the electronic device formerly occupied by the oil; initiating ultrasonic excitation of the oil in the tank to aid in degassing the oil; and transferring degassed dielectric oil from the tank to the electronic device while ambient pressure within the tank and the electronic device remain reduced.

In an alternate embodiment, the method further comprises connecting a power cable from the apparatus to the electronic device. In a further alternate embodiment, the method further comprises isolating an internal volume of the electronic device from the apparatus by closing fluid connections therebetween; and testing the air-tightness of the electronic device by monitoring the reduced pressure therein; wherein the steps of isolating and testing occur prior to the step of transferring degassed dielectric oil from the tank to the electronic device. In a still further alternate method, the method further comprises setting at least one bellows in the electronic device before or during the step of transferring degassed dielectric oil from the tank to the electronic device.

In an embodiment of the method, the dielectric oil degassed is a polyalphaolefin (PAO). In an alternate embodiment of the method, the electronic device is a portable radio-frequency transmitter. In an alternate embodiment of the method, the radio-frequency transmitter is an ALQ-99 transmitter.

DETAILED DESCRIPTION OF PREFERRED EMBODIMENTS

Figure 1:
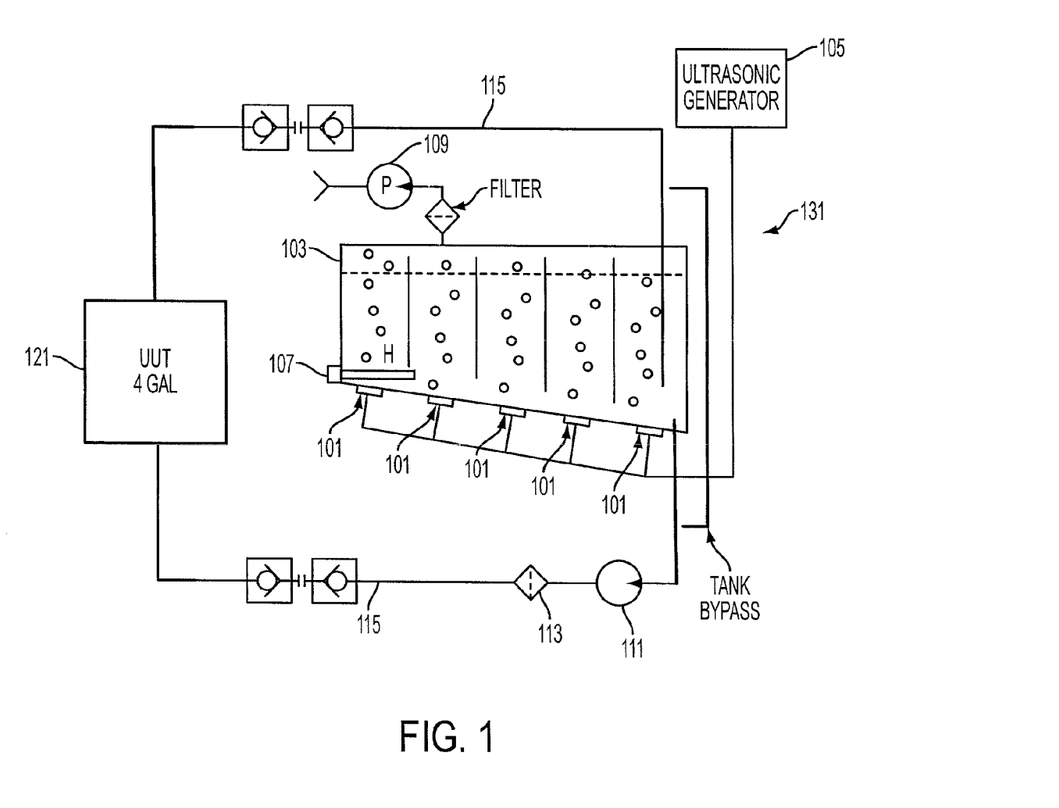
FIG. 1 shows a schematic representation of an embodiment of a degassing apparatus connected to an RF transmitter.

In an embodiment, a degassing apparatus is required to remove poly-alpha-olefin (PAO) from an RF transmitter, termed a unit under test (UUT), degas the PAO, and refill the UUT with the processed PAO. FIG. 1 provides a schematic of an embodiment of an oil degassing apparatus 131 that can be used to perform these functions, among others. In an embodiment consistent with the figure shown in FIG. 1, the apparatus performs these steps in such a way that the final dissolved gas content of the PAO in the UUT after the UUT is refilled is less than or equal to 1.75%. An apparatus 131 such as is shown in FIG. 1 can be used to process oil to meet the requirements of an ALQ-99 tactical jamming system. The apparatus hardware consists of a set of transducers 101 attached to a tank 103, an ultrasonic power generator 105, a heater 107, vacuum pump 109, a fluid pump 111, an oil filter 113, and fluid connections 115 between the apparatus 131 and the UUT 121.

During operation of an embodiment, such as is shown in FIG. 1, PAO is pulled into the tank 103 from the UUT 121 after the pressure in the tank 103 has been reduced by use of the vacuum pump 109. The ultrasonic transducers 101 are excited by the power generator 105 to create ultrasonic pressure waves in the tank 103, causing dissolved gasses to coalesce into bubbles. In an embodiment, the ultrasonic pressure waves are pulsed, since a momentary suspension of sonication of the oil allows the coalesced gas bubbles to rise more efficiently to the oil's surface and escape to the evacuated space adjacent to the oil within the tank 103. The apparatus so processes the oil in the tank 103 for a period of time, until the PAO is sufficiently degassed. The vacuum pump 109 maintains a reduced pressure in the tank 103 throughout this degassing process.

Figure 2:
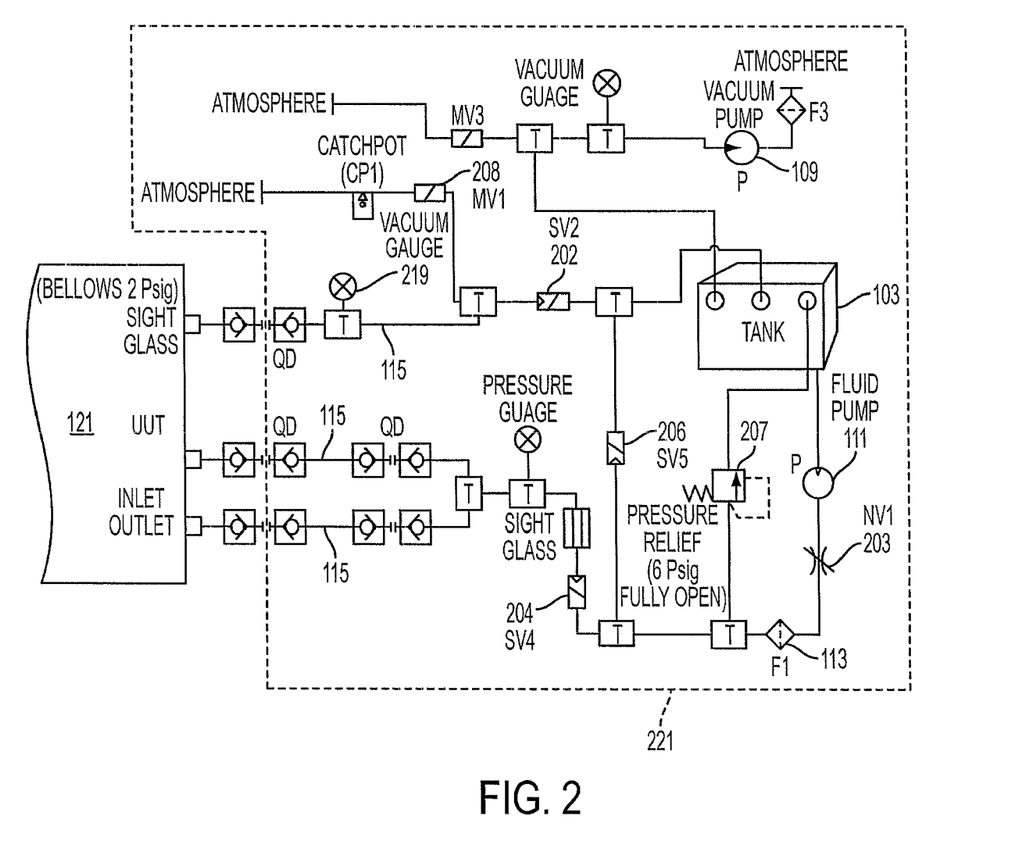
FIG. 2 shows a fluid flow diagram of an alternate embodiment of a degassing apparatus connected to a RF transmitter.

A method for operating a degassing apparatus will be more particularly described with reference to a fluid flow diagram for an embodiment of such a degassing apparatus, as is shown in FIG. 2. The components of the apparatus shown in FIG. 2 are similar to those of the apparatus shown in FIG. 1. Additional apparatus components shown in FIG. 2 will be described in light of the method, as described below.

In general, an embodiment of the method comprises reducing the pressure in the tank 103 through operation of the vacuum pump 109 (sometimes referred to herein as creating a vacuum in the tank 103, even though the reduced pressure in the tank is not a complete vacuum), opening a fluid connection between the tank 103 and the UUT 121, allowing the PAO in the UUT 121 to drain into the tank 103, closing the fluid connection between the tank 103 and the UUT 121, monitoring the pressure in the UUT 121 to check for air leaks therein, heating the PAO in the tank 103 through operation of the heating element 107, applying pulsed sonication to the PAO in the tank 103 through operation of the transducers 101 powered by the generator 105 until the dissolved gases and moisture within the PAO are sufficiently removed, reopening fluid connection to the UUT 121, pumping degassed PAO through a filter 113 back to the UUT 121 to refill the UUT 121 using the fluid pump 111, and disconnecting the UUT 121 from the apparatus 131.

In an embodiment, the apparatus 221 is powered from externally provided single phase 120 V, 60 Hz AC and three phase 208 V, 400 Hz AC. During operation some of the 208 V, 400 Hz AC is allocated to operating the UUT 121, particularly for operation of the UUT internal pump, and the remaining 208 V, 400 Hz AC is used internally by the apparatus 221 to operate the heater 107.

A second embodiment of a method for processing transmitter oil now will be more specifically described with respect to use of an embodiment of a degassing apparatus for processing oil from high band RF transmitters such as the ALQ-99. In this second method embodiment, PAO is conditioned in three ways: the total dissolved gas content is decreased (degas), the moisture content is reduced (demoist), and particulates are filtered out.

The initial setup of such second embodiment of the method requires making three fluid connections 115 between the apparatus 221 and the UUT 121, and one electrical connection therebetween. The operator connects two hoses on the front of the apparatus 221 to Wiggins fittings on the underside of the UUT 121. In this instance, the interface hoses contain Wiggins connections because all of the ALQ-99 UUTs require this interface. A quick disconnect and pressure gauge are installed onto the UUT sight glass and attached to a third hose connected to the apparatus 221. Finally a power cable is connected from a three phase 208 V, 400 Hz AC power connector on the apparatus 221 to the main electrical connection on the top of the UUT 121.

The apparatus 221 is powered from externally provided single phase 120 V, 60 Hz AC and three phase 208 V, 400 Hz AC electrical power. The 120 V, 60 Hz AC power operates the vacuum pump 109, fluid pump 111, internal apparatus controls and external displays on the apparatus 221. A portion of the 208 V, 400 Hz AC is used to operate the heater 107, and a portion is split off to provide power to the UUT 121, particularly for operation of the UUT internal pump.

In this second embodiment, the apparatus 221 has three modes of operation, drain mode, degas mode and fill mode, each having its own configuration of apparatus fluid flow valves. In an alternate embodiment, two or more of these modes are combined. During a typical oil processing run with this second embodiment, these three modes operate sequentially. In drain mode, fluid connections are opened between the apparatus 221 and the UUT 121, and oil is drained from the UUT 121 into the apparatus 221. In degas mode, the fluid connections between the UUT 121 and the apparatus 121 are closed, while the apparatus 221 is operated to degas the oil. In fill mode, fluid connections between the apparatus 221 and the UUT 121 are opened again so that the oil can be pumped back into the UUT 121.

Once fluid connections are made between the UUT 121 and the apparatus 221, and a vacuum has been created in the tank 103 by operation of the vacuum pump 109, the apparatus 221 is set to the drain mode. In drain mode, fill valve 202 is closed, drain valve 204 is open, and recirculation valve 206 is open. An operator manually opens vent valve 208 to allow air into the UUT 121. Air pressure applied through vent valve 208 pushes the oil from the UUT 121 through drain valve 204 and recirculation valve 206 into the tank 103, which is under vacuum. In an alternate embodiment a vent valve 208 is part of the UUT 121 and not part of the apparatus 221. In another alternate embodiment, oil draining from the UUT 121 to the tank 103 passes through a filter, which removes particulates from the oil prior to the oil entering the tank 103. After the oil is drained from the UUT 121, the vent valve 208 is closed so that a vacuum is created in the UUT 121.

In this second embodiment, while the apparatus 221 is in drain mode, the UUT 121 is isolated from the apparatus 221, particularly from the vacuum pump 109. Thus, after the UUT 121 has been evacuated, then isolated from the apparatus 221, if the UUT 121 is not air tight, the vacuum therein will decay as air leaks in to the UUT 121 from external thereto. While the apparatus 221 processes oil, then, an operator monitors the vacuum level in the UUT 121 at vacuum gauge 219 to determine whether a leak exists, and therefore whether further maintenance must be performed on the UUT 121. In an embodiment, this leak testing of the UUT 121 is automated, such that instrumentation senses or records UUT pressure and signals whether a leak in the UUT 121 exists.

Continuing with a description of the second embodiment, with PAO from the UUT 121 contained in the tank 103, and both the tank 103 and the UUT 121 under vacuum, though not having a fluid connected therebetween, the apparatus 221 is set to degas mode. In degas mode, fill valve 202 remains closed, drain valve 204 is closed, and recirculation valve 206 remains open. In an embodiment, the fluid pump 111 is operated while the apparatus 221 is in the degas mode to circulate the oil from the tank 103 through recirculation valve 206 and back into the tank.

In preparation for degassing, the PAO inside the tank 103 is heated to between about 45° C. and about 55° C. In this embodiment heating is performed using four 500-Watt heating elements. These heaters are controlled using a temperature sensing feedback control, thermocouple, and a solid-state switch. If the oil volume is too low in the tank 103, the heater will not operate; thus, protecting the heating elements from burn-out. In a preferred embodiment, the oil is heated to between about 45° C. and about 50° C. In a more preferred embodiment, the oil is heated to about 45° C.

After heating the PAO, the ultrasonic generator 105 is switched on to supply power to the transducers 101 on the tank 103. In this embodiment, there are eight transducers 101 attached to the tank 103 in an equally spaced arrangement. An alternate embodiment includes at least one transducer. In further alternate embodiments, the transducers are attached to the exterior surface of the tank 103, or are positioned interior to the tank 103. The transducers 101 of the second embodiment operate at a frequency of 40 KHz and are pulsed on and off with a 50% duty cycle. The average power level achieved during sonication of the oil using these transducers is 230 Watts. Degassing of the oil occurs most efficiently in this apparatus 221 while pulsed sonication is occurring. In the second embodiment, the degassing by sonication process operates for approximately 15 minutes and is controlled by a timer. In this second embodiment, operator intervention or monitoring is not required during the degassing process.

The degassing process—sonication of heated oil under vacuum—also removes moisture from the oil. One mechanism for this process is the escape from the oil of water as water vapor that enters gas bubbles formed in the oil as a result of sonication. The method of processing transformer oil as herein described should not be considered limited to such a mechanism for water removal, however.

In this second embodiment, after degassing, the apparatus 221 is set to fill mode. In fill mode, fill valve 202 is open, drain valve 204 is open, and recirculation valve 206 is closed, thereby creating a fluid loop from the tank 103 to the UUT 121 and back to the tank 103. The fluid pump 111 is turned on, and PAO is pumped from the tank 103 through a filter 113, through drain valve 204, into the UUT 121, and back to the tank 103 through fill valve 202. The vacuum maintained in the UUT 121 ensures that little to no gasses are present in the UUT 121 upon reentry of the PAO during fill mode. The absence of gasses in the UUT 121 means that gasses will not re-dissolve in the PAO upon refill of the UUT 121, and further reduces the chances that gasses in the UUT 121 may become trapped in small pockets or cavities potentially later causing poor performance of the RF transmitter. So long as there is excess PAO in the apparatus 221 as compared to the volume of PAO required to fill the UUT 121, the return path through fill valve 202 ensures that the UUT 121 is completely filled, since in this embodiment the UUT 121 must be filled before PAO will exit the UUT 121 at the outlet leading to fill valve 202. In an alternate embodiment, refilling of the UUT 121 occurs by alternate processes, including such a process whereby oil volume is measured as it is pumped back to the UUT 121, and pumping is stopped upon reaching a certain volume of pumped oil, so that oil need not be pumped back to the tank 103 to ensure the UUT 121 is full.

In this second embodiment, the output of the fluid pump 111 flows through a needle valve 203, then through a filter 205 to remove particulates from the oil prior to re-entry into the UUT 121. The needle valve's purpose is to provide at least a minimum pressure at the output of the fluid pump 111 as is required for proper operation of the fluid pump 111. In an embodiment, the fluid pump 111 is set to pump at a rate of approximately 1.2 gallons per minute, the needle valve 203 provides at least 20 psig pressure at the fluid pump output, and the filter is a 5-micron filter. The apparatus pressure on the far side of the needle valve 203 from the fluid pump 111 is limited by a relief valve 207, which fully opens to return oil to the tank 103 if the pressure on the output side of the fluid pump 111 reaches an upper threshold value. The relief valve operates to protect the UUT 121 from experiencing a pressure that might damage the UUT 121. In an embodiment the relief valve 207 is set to fully open when the pressure in the fluid connection 115 on the far side of the pump from the needle valve is at least 6 psig. In an embodiment, the UUT 121 would be damaged by a pressure of 8 psig or greater, so that a relief valve 203 that opens at 6 psig protects the UUT 121 from damage.

If the UUT 121 comprises one or more bellows that allow for PAO expansion and contraction as the oil within the UUT 121 is heated and cooled, as for the ALQ-99 and other RF transmitters, the bellows position should be set during the step of refilling of the UUT 121.

In an embodiment, the apparatus 221, includes an automated self-test mode, a fourth mode of operation. Operation of the apparatus 221 in the self-test mode allows the operator to verify proper operation of the apparatus 221 prior to beginning oil processing. In an embodiment, the primary tests performed are vacuum, heating capability, ultrasonic power level, and the fluid pumping ability. Vacuum testing during self-test verifies that the vacuum pump is working, as well as verifying the capability of the apparatus 221 to maintain a vacuum.

EXAMPLES

A batch processing investigation, results of which are presented in the table below, demonstrate that using a combination of PAO heated to 50° C., a vacuum of 28.5 in Hg and application of ultrasonic pressure waves for a minimum of 15 minutes will reduce the dissolved gas content below 1.75% in a 5 gallon tank. The dissolved gas content of 0.83%, which was achieved with this method, was verified by performing a dissolved gas analysis (DGA) test using a gas chromatograph by an outside laboratory. The apparatus parameters of heat, vacuum, ultrasonics and quantity of PAO were varied on an individual basis. A tripling of the quantity of PAO from 5 to 15 gallons resulted in a final dissolved gas content value of 1.75%, demonstrating the effectiveness of ultrasonics. Decreasing the vacuum to 27 in Hg or removing the heating stage of the process resulted in a dissolved gas content that was 2.02% and 4.43%, respectfully. When the ultrasonic processing is removed, however, the dissolved gas content was measured at 11.66%, which is practically speaking, nearly unchanged from the 13.5% saturated level. Based on these results it can be said that ultrasonics provides a fast efficient method of degassing PAO.

Figure 3:
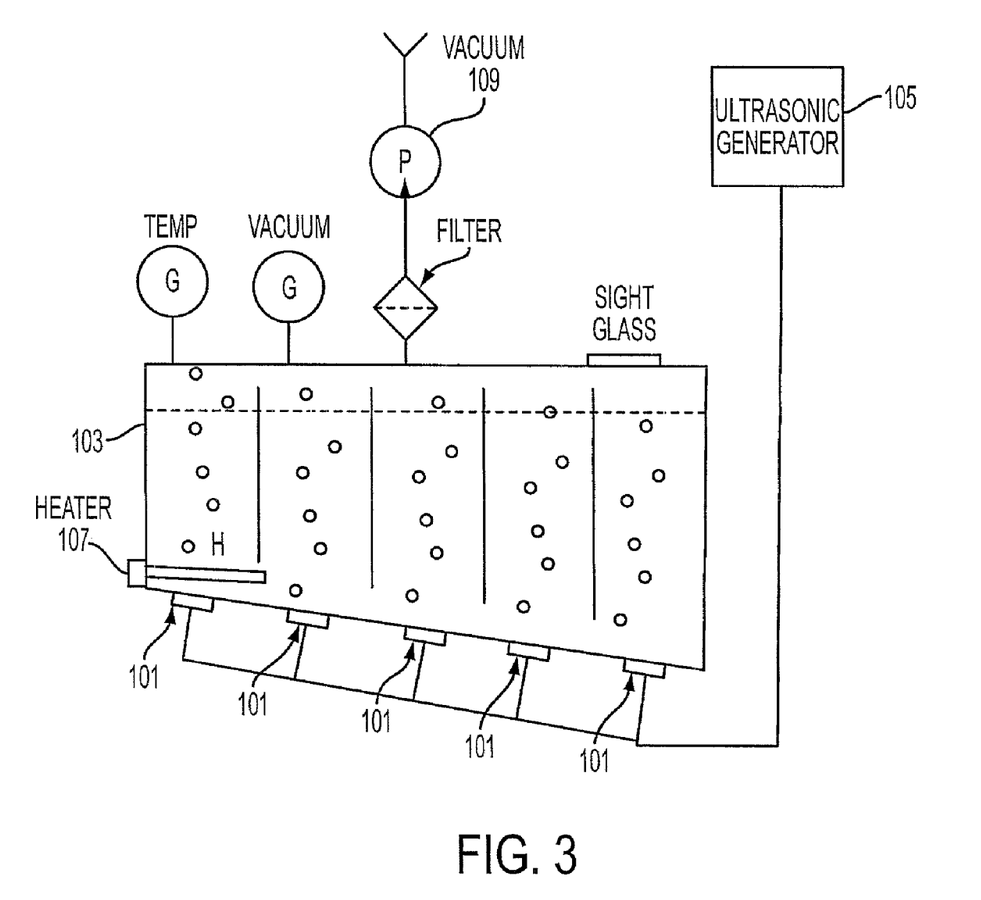
FIG. 3 shows a schematic representation of a prototype apparatus used to test degassing methodology.

This investigation was performed using a set-up represented by the schematic in FIG. 3, on which figure apparatus components similar to those described above with respect to the other figures are labeled with the same reference numbers as are used in the other figures. The investigation consisted of obtaining a prototype LCU tank and modifying it by attaching 10 transducers to the bottom. The tank was mounted vertically where the processing could be monitored. The transducers were excited using a 500 W generator producing a gated 40 KHz signal. The signal was further modified to produce a duty cycle of 50% using variable power control. Located on the top of the tank was a 2 inch threaded hole where a level sensor was normally mounted. The level sensor was removed and a ¼ inch thick piece of transparent plastic was applied to create a viewing port. Using this port the ultrasonic degassing process could be observed. Installed on the lower side of the tank was a 500 W heater element that was used to heat the PAO during processing. On the top of the tank was a thermometer, a vacuum gauge and a port connected to a vacuum pump.

The goal was to degas 5 gallons of PAO in a minimal amount of time. The choice to degas 5 gallons of PAO was made because a typical ALQ-99 transmitter requires 4 gallons of PAO and it is estimated that 1 gallon of PAO would be required to fill the hoses and piping within the apparatus. Fresh PAO was obtained from a newly purchased container for this test, providing a gas-saturated and not otherwise contaminated sample. The PAO was first heated to 50° C. This required approximately 36 minutes using the 500 Watt heating element. Next vacuum and ultrasonics were applied. The vacuum was measured at 28.5 in. Hg and the ultrasonic generator power level set at maximum, 500 Watts using a 50% duty cycle for a specified time period. Vacuum was removed and a sample of PAO taken at the conclusion of the ultrasonic processing.

The data from testing is shown in Table 1. It is important to note here that the steps of the process were performed serially. The processing time listed represents the amount of time that the ultrasonic transducers were operational. The time to heat the PAO and obtain the required vacuum is not specified. Samples were taken from the bottom of the tank into a gas tight syringe. The syringes were taken to a qualified laboratory where the DGA analysis is performed. Note that, as presented in Table 1, rows 1 and 2, the resulting gas content is less that 0.8% when processed for 30 minutes and 0.83% for 15 minutes. Since the resulting difference was insignificant 15 minutes was chosen as the processing time period for future testing. Variations were performed to determine the effects on the total process. The results are shown in Table 1, rows 3 through 6. These tests were performed to answer some basic questions concerning the efficiency of ultrasonic degassing. It can be determined from entry 4 that ultrasonics greatly enhances the degassing process. Without the use of ultrasonics the dissolved gas content of the PAO only dropped to 11.66%; only about 2% was removed when compared to a PAO sample that had become saturated with dissolved gas when exposed to the atmosphere. Entry 3 shows that a 15 gallon sample can be degassed in the same amount of time with slightly higher gas content. Entry 5 shows that ultrasonics with the existing vacuum pump in the LCU (maximum vacuum level 26.5 in HG) can reduce the gas content to 2%. A longer process time may reduce the dissolved gas to the 1.75% level required by ALQ-99 specifications. Finally entry 6 shows that not adding heat, which when added reduces oil viscosity, slowed the degassing process. In all cases the dissolved gas content is closer to the requirement using ultrasonics than by just using vacuum alone.

TABLE 1

Summary of Test Results

| Trial | Vol. (gal.) | Temp. (° C.) | Vacuum (in. Hg) | Process Time (min.) | Process Power | Gas Content |
|---|---|---|---|---|---|---|
| 1 | 5 | 50 | 28.5 | 30 | full, 50% duty | 0.80% |
| 2 | 5 | 50 | 28.25 | 15 | full, 50% duty | 0.83% |
| 3 | 15 | 50 | 28.8 | 15 | full, 50% duty | 1.75% |
| 4 | 5 | 50 | 28.9 | 15 | None | 11.66% |
| 5 | 5 | 50 | 27 | 15 | full, 50% duty | 2.02% |
| 6 | 5 | 24 | 26.8 | 15 | full, 50% duty | 4.43% |

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention. For example, an embodiment in which the interstice is not part of an inner multi-layered fabric, but is created by a so-called double-walled tank structure, is also encompassed by this specification.

The invention claimed is:

1. An apparatus for the batch degassing of a dielectric oil, said apparatus comprising:
    a tank for holding dielectric oil transferred from an electronic device;
    at least one ultrasonic transducer for generating ultrasonic frequency waves within said tank;
    a vacuum pump connected to said tank and capable of reducing the ambient pressure within said tank;
    a first and a second fluid transfer conduit adapted to connect said tank to said electronic device for transfer of oil therebetween;
    a vent valve connected to said first fluid transfer conduit, which when open allows ambient air external to said tank and said electronic device to enter said first fluid transfer conduit;
    a fluid pump connected to said second fluid transfer conduit and capable of pumping oil in a first flow direction from said tank to said electronic device through said second fluid transfer conduit; and a pressure relief valve having an inlet and an outlet, said inlet connected to said second fluid transfer conduit at a position after said fluid pump along said first flow direction, said outlet connected to said tank, said pressure relief valve allowing flow therethrough in a direction from said second fluid transfer conduit to said tank when fluid pressure in said second fluid transfer conduit reaches a threshold value set for the purpose of protecting said electronic device from experiencing fluid pressures higher than said threshold value.

2. The apparatus of claim 1 further comprising a power outlet that can be connected to said electronic device to supply power thereto.

3. The apparatus of claim 2 wherein said power outlet provides 208 V, 400 Hz AC electric power.

4. The apparatus of claim wherein said at least one ultrasonic transducer is attached to the outside of said tank.

5. The apparatus of claim 4 wherein said at least one ultrasonic transducer comprises a number of ultrasonic transducers, said number being in the range of about 8 to about 10.

6. The apparatus of claim 1 wherein said electronic device is a portable radio-frequency transmitter.

7. The apparatus of claim 6 wherein said transmitter contains fewer than 20 gallons of dielectric oil.

8. The apparatus of claim 6 wherein said transmitter is an ALQ-99 tactical jamming transmitter.

9. A method of batch degassing dielectric oil used in an electronic device comprising:

providing an apparatus for degassing dielectric oil, said apparatus comprising:

a tank for holding dielectric oil transferred from an electronic device;

at least one ultrasonic transducer for generating ultrasonic frequency waves within said tank;

a vacuum pump connected to said tank and capable of reducing the ambient pressure within said tank;

a first and a second fluid transfer conduit adapted to connect said tank to said electronic device for transfer of oil therebetween; a vent valve connected to said first fluid transfer conduit, which when open allows ambient air external to said tank and said electronic device to enter said first fluid transfer conduit;

a fluid pump connected to said second fluid transfer conduit and capable of pumping oil in a first flow direction from said tank to said electronic device through said second fluid transfer conduit; and a pressure relief valve having an inlet and an outlet, said inlet connected to said second fluid transfer conduit at a position after said fluid pump along said first flow direction, said outlet connected to said tank, said pressure relief valve allowing flow therethrough in a direction from said second fluid transfer conduit to said tank when fluid pressure in said second fluid transfer conduit reaches a threshold value set for the purpose of protecting said electronic device from experiencing fluid pressures higher than said threshold value connecting said first and second fluid transfer conduits between said apparatus and said electronic device;

reducing ambient pressure in said tank through operation of said vacuum pump;

transferring substantially all dielectric oil from said electronic device to said tank through said first fluid transfer conduit as a result of a pressure differential between said tank and said electronic device;

reducing ambient pressure in a space within said electronic device formerly occupied by said oil;

initiating ultrasonic excitation of said oil in said tank to aid in degassing said oil; and transferring degassed dielectric oil from said tank to said electronic device while ambient pressure within said tank and said electronic device remain reduced.

10. The method of claim 9 further comprising the step of connecting a power cable from said apparatus to said electronic device.

11. The method of claim 9 further comprising the steps of:

isolating an internal volume of said electronic device from said apparatus by closing fluid connections therebetween; and testing the air-tightness of said electronic device by monitoring the reduced pressure therein;

wherein said steps of isolating and testing occur prior to said step of transferring degassed dielectric oil from said tank to said electronic device.

12. The method of claim 9 further comprising setting at least one bellows in said electronic device before or during said step of transferring degassed dielectric oil from said tank to said electronic device.

13. The method of claim 9 wherein said dielectric oil is a polyalphaolefin (PAO).

14. The method of claim 9 wherein said electronic device is a portable radio-frequency transmitter.

15. The method of claim 14 wherein said radio-frequency transmitter is an ALQ-99 transmitter.

* * * * *